(12) United States Patent
Lu et al.

(10) Patent No.: US 12,295,304 B2
(45) Date of Patent: May 13, 2025

(54) PLANT GROWTH LIGHTING DEVICE HAVING MULTI-FUNCTION HEAT DISSIPATION STRUCTURE

(71) Applicant: Shinegrow (Xiamen) Lighting Technology Co., LTD., Fujian (CN)

(72) Inventors: Fuxing Lu, Fujian (CN); Sishan Liao, Fujian (CN)

(73) Assignee: Shinegrow (Xiamen) Lighting Technology Co., LTD.

(*) Notice: Subject to any disclaimer, the term of this patent is extended or adjusted under 35 U.S.C. 154(b) by 1 day.

(21) Appl. No.: 18/244,301

(22) Filed: Sep. 11, 2023

(65) Prior Publication Data
US 2024/0130301 A1 Apr. 25, 2024
US 2024/0224890 A9 Jul. 11, 2024

(30) Foreign Application Priority Data

Oct. 19, 2022 (CN) .......................... 202211280349.6

(51) Int. Cl.
*A01G 9/24* (2006.01)
*F21S 4/28* (2016.01)
(Continued)

(52) U.S. Cl.
CPC .............. *A01G 9/249* (2019.05); *F21S 8/063* (2013.01); *F21V 15/01* (2013.01); *F21V 29/75* (2015.01);
(Continued)

(58) Field of Classification Search
CPC ........ A01G 9/249; A01G 7/045; F21V 29/75; F21V 29/763; F21V 29/83; F21V 15/01;
(Continued)

(56) References Cited

U.S. PATENT DOCUMENTS 11,818,992 B1 * 11/2023 Luo .......................... F21V 21/30
2006/0254135 A1   11/2006 Dubuc
(Continued)

FOREIGN PATENT DOCUMENTS

CN        101749672 A  *  6/2010   ................ F21S 4/28
CN        208859577 U     5/2019
(Continued)

OTHER PUBLICATIONS

Chen Y D, "Light Emitting Diode Light Fitting", Jun. 23, 2010, English machine translation text of CN 101749672 A, Clarivate Analytics. (Year: 2010).*

*Primary Examiner* — Alan B Cariaso
(74) *Attorney, Agent, or Firm* — Winston Hsu

(57) ABSTRACT

A plant growth lighting device having multi-function heat dissipation structure includes a heat dissipation base and a light source board. The heat dissipation base includes a substrate, two structure supporting fins disposed on the first surface of the substrate, two assistant fins, a plurality of heat dissipation fins and two fixation portions disposed on the second surface of the substrate. The installation space is formed between the two fixation portions and the substrate. The light source board is disposed in the installation space. The two assistant fins are disposed between the two structure supporting fins and the heat dissipation fins are disposed between the two assistant fins. The two structure supporting fins, the two assistant fins and the heat dissipation fins extend from one end of the substrate to the other end of the substrate.

7 Claims, 14 Drawing Sheets

(51) Int. Cl.
*F21S 8/06* (2006.01)
*F21V 15/01* (2006.01)
*F21V 21/00* (2006.01)
*F21V 21/34* (2006.01)
*F21V 23/00* (2015.01)
*F21V 29/75* (2015.01)
*F21V 29/76* (2015.01)
*F21V 29/83* (2015.01)
*F21V 31/00* (2006.01)
*F21Y 105/16* (2016.01)

(52) U.S. Cl.
CPC ............ *F21V 29/763* (2015.01); *F21V 29/83* (2015.01); *F21S 4/28* (2016.01); *F21V 21/00* (2013.01); *F21V 21/34* (2013.01); *F21V 23/002* (2013.01); *F21V 31/005* (2013.01); *F21Y 2105/16* (2016.08); *Y02P 60/14* (2015.11)

(58) Field of Classification Search
CPC ...... F21V 21/34; F21V 23/002; F21V 31/005; F21V 21/00; F21S 8/063; F21S 4/28; Y02P 60/14
See application file for complete search history.

(56) References Cited

U.S. PATENT DOCUMENTS

| | | | |
|---|---|---|---|
| 2009/0120612 A1* | 5/2009 | Zhang | F21V 29/75 165/80.3 |
| 2010/0328945 A1 | 12/2010 | Song | |
| 2014/0049964 A1 | 2/2014 | McClure | |
| 2015/0116997 A1* | 4/2015 | Tappert | A01G 9/249 362/249.03 |
| 2017/0352605 A1* | 12/2017 | Bilan | F21V 29/76 |
| 2020/0084975 A1* | 3/2020 | Wang | F21V 21/116 |
| 2021/0116121 A1* | 4/2021 | Xu | F21K 9/275 |

FOREIGN PATENT DOCUMENTS

| | | |
|---|---|---|
| CN | 212644441 U | 3/2021 |
| CN | 215001272 U | 12/2021 |
| CN | 216693218 U | 6/2022 |

\* cited by examiner

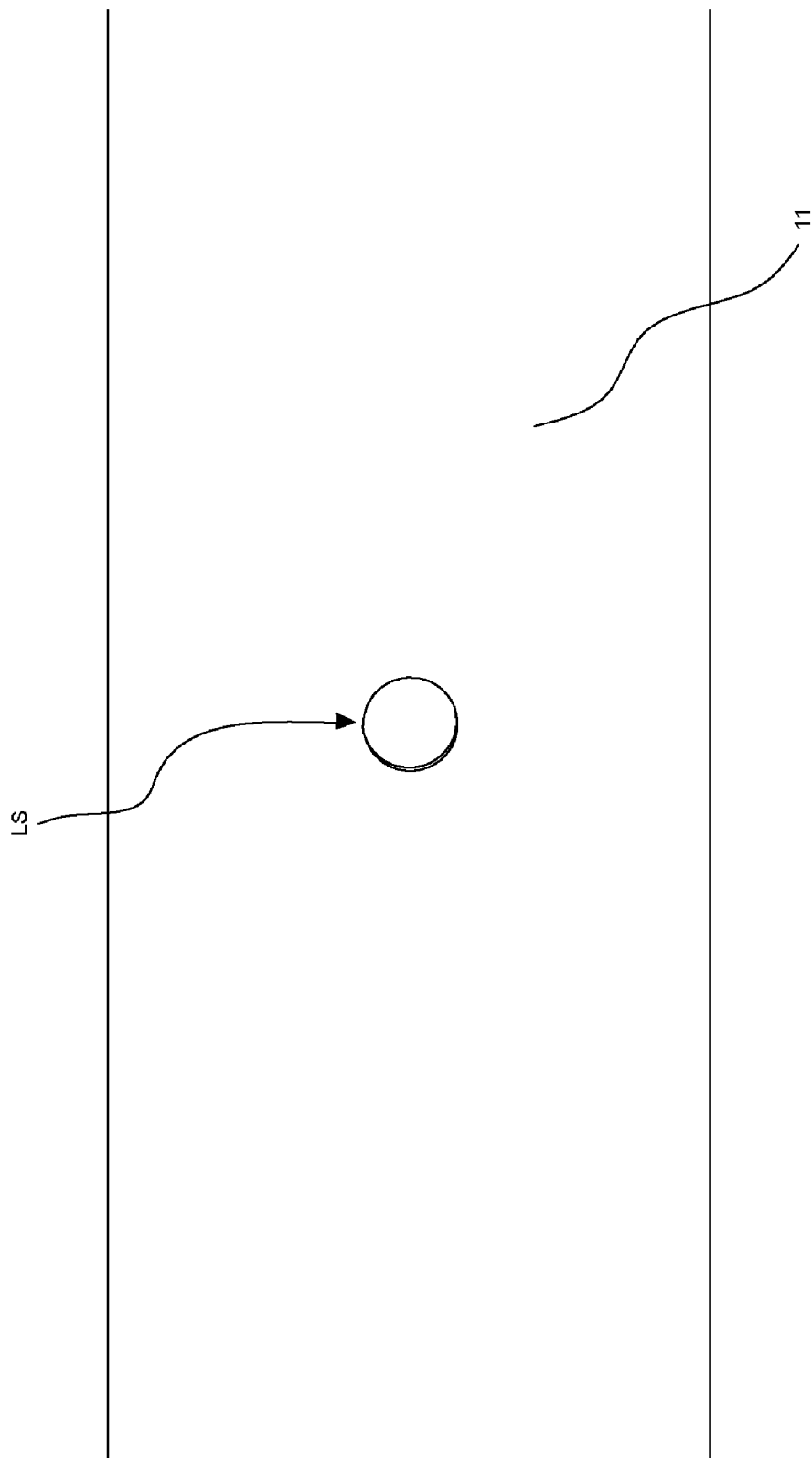

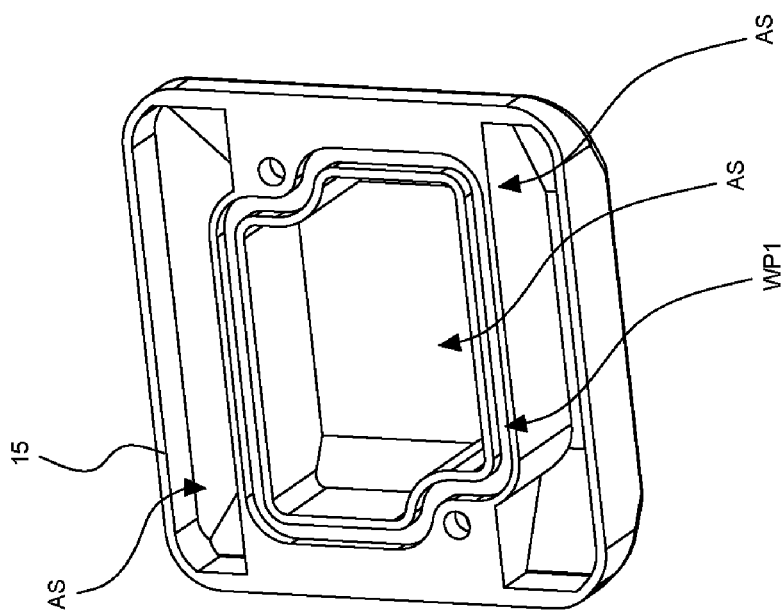

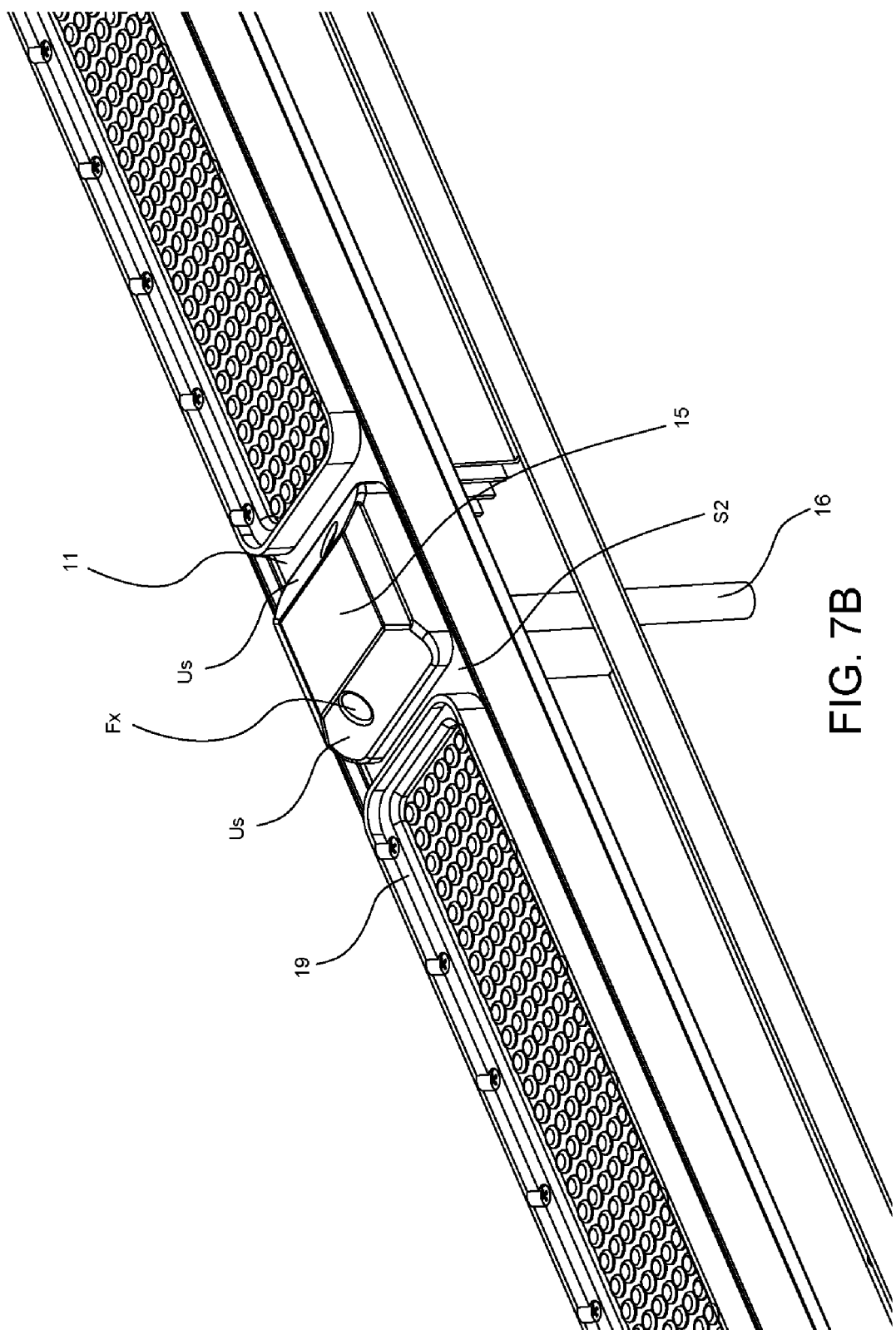

PLANT GROWTH LIGHTING DEVICE HAVING MULTI-FUNCTION HEAT DISSIPATION STRUCTURE

BACKGROUND OF THE INVENTION

1. Field of the Invention

The present invention relates to a plant growth lighting device, in particular to a plant growth lighting device having multi-function heat dissipation structure.

2. Description of the Prior Art

Due to advance of technology, the functions of plant growth lighting devices have been significantly improved. However, the power of currently available plant growth lighting devices is limited due to poor heat dissipation performance thereof. In addition, the length of the currently available plant growth lighting devices cannot be further increased because of the structural designs thereof. Therefore, the length of most currently available plant growth lighting devices is less than 1.5 m. In order to improve the heat dissipation performance, the heat dissipation structures of the currently available plant growth lighting devices need a large number of heat dissipation fins, which greatly increases the manufacturing cost of these plant growth lighting devices.

SUMMARY OF THE INVENTION

One embodiment of the present invention provides a plant growth lighting device having multi-function heat dissipation structure, which includes a heat dissipation base and a light source board. The heat dissipation base includes a substrate, two structure supporting fins disposed on the first surface of the substrate, two assistant fins, a plurality of heat dissipation fins and two fixation portions disposed on the second surface of the substrate. The installation space is formed between the two fixation portions and the substrate. The light source board is disposed in the installation space. The two assistant fins are disposed between the two structure supporting fins and the heat dissipation fins are disposed between the two assistant fins. The two structure supporting fins, the two assistant fins and the heat dissipation fins extend from one end of the substrate to the other end of the substrate.

In one embodiment, each of the assistant fins includes a vertical portion disposed on the substrate and a horizontal portion disposed on the vertical portion. The horizontal portion extends toward the structure supporting fin adjacent thereto, whereby the assistant fin is L-shaped.

In one embodiment, each of the structure supporting fins includes a base portion disposed on the substrate and an L-shaped extending portion disposed on the base portion. The L-shaped extending portion extends toward the assistant fin adjacent thereto.

In one embodiment, the plant growth lighting device further includes a hook holder including a central frame body and two L-shaped fixation portions disposed at the two ends of the central frame body respectively.

In one embodiment, the central frame body has a central hole and each of the L-shaped fixation portions has a lateral hole.

In one embodiment, the plant growth lighting device further includes a hook having two hook portions. Each of the hook portions penetrates through the central hole and the lateral hole of the L-shaped fixation portion corresponding thereto.

In one embodiment, the plant growth lighting device further includes two L-shaped decoration plates disposed on the two assistant fins respectively.

In one embodiment, the plant growth lighting device further includes two end caps disposed at two ends of the heat dissipation base.

In one embodiment, the plant growth lighting device further includes a water-proof cover. The substrate has a wire hole and a wire passes through the wire hole via the first surface in order to connect to the light source board. The water-proof cover is disposed on the second surface and cover the wire hole.

In one embodiment, the heat dissipation base has a ventilation channel passing through the two assistant fins and the heat dissipation fins.

The plant growth lighting device having multi-function heat dissipation structure in accordance with the embodiments of the present invention may have the following advantages:

(1) In one embodiment of the present invention, the heat dissipation base of the plant growth lighting device has two structure supporting fins, two assistant fins and a plurality of heat dissipation fins. The two structure supporting fins can connect to a hook and provide the supporting function. The two assistant fins can mount two L-shaped decoration plates. All of the above fins can provide the heat dissipation function, such that the heat dissipation area of the plant growth lighting device can be greatly increased and the plant growth lighting device can achieve excellent heat dissipation performance without increasing the number of these fins. Therefore, the manufacturing cost of the plant growth lighting device can be reduced and the power thereof can be also effectively increased.

(2) In one embodiment of the present invention, the heat dissipation base of the plant growth lighting device has at least one ventilation channel, which can penetrate through the two assistant fins and heat dissipation fins. The above structure design can effectively enhance air convection, such that the heat dissipation performance of the plant growth lighting device can be further improved.

(3) In one embodiment of the present invention, the heat dissipation base of the plant growth lighting device has a multi-function heat dissipation structure, which not only can achieve great heat dissipation performance, but also can enhance the structural strength of the heat dissipation base. Thus, the plant growth lighting device can always have enough structural strength even if the length thereof is greater than 1.5 m.

(4) In one embodiment of the present invention, the hook of the plant growth lighting device is disposed on a hook holder having the safety structure, which can effectively prevent the plant growth lighting device from falling off the hook because of the impact caused by an external force. Therefore, the safety of the plant growth lighting device can be effectively enhanced.

(5) In one embodiment of the present invention, the plant growth lighting device further includes a water-proof cover. The wire passes through the wire hole via the first surface of the substrate so as to connect to the light source board. The water-proof cover is disposed on the second surface and covers the wire hole. Besides, the wire can be provided with a water-proof connector. The above structure design can greatly enhance the waterproof performance of the plant growth lighting device.

(6) In one embodiment of the present invention, the plant growth lighting device further includes a lens and the lens has a reinforcement rib, a water-proof rubber ring installation groove and weight-reducing grooves. The above structural design not only can enhance the waterproof performance of the plant growth lighting device, but also can decrease the weight of the plant growth lighting device without influencing the structural strength thereof.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein:

FIG. 6A is a first partial enlarged view for illustrating the structure of the plant growth lighting device having multi-function heat dissipation structure in accordance with one embodiment of the present invention.

FIG. 7A is a first schematic view for illustrating a structure of a water-proof cover of the plant growth lighting device having multi-function heat dissipation structure in accordance with one embodiment of the present invention.

FIG. 7B is a second schematic view for illustrating the structure of the water-proof cover of the plant growth lighting device having multi-function heat dissipation structure in accordance with one embodiment of the present invention.

DETAILED DESCRIPTION

Figure 1:
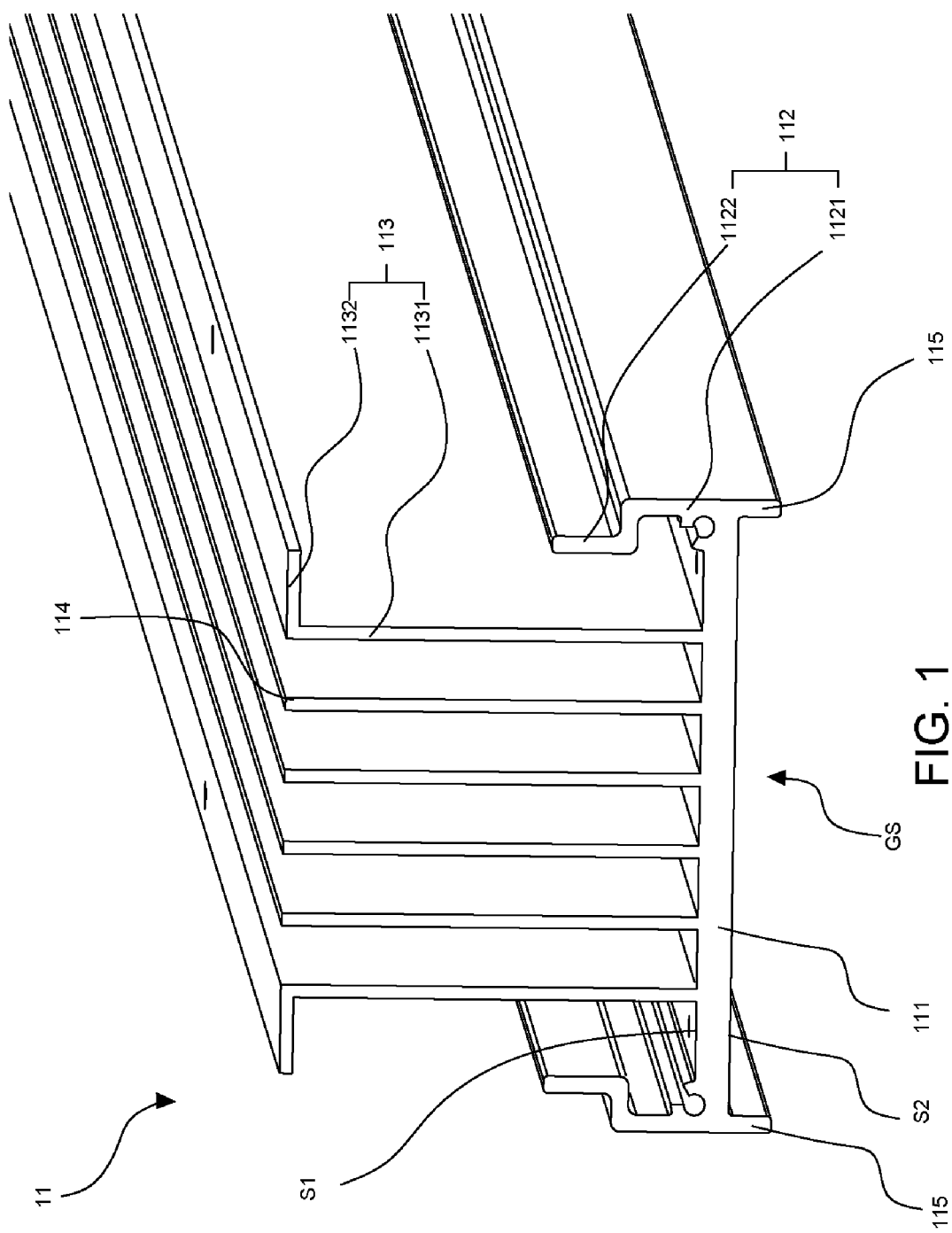
FIG. 1 is a first schematic view for illustrating a structure of a heat dissipation base of a plant growth lighting device having multi-function heat dissipation structure in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 2:
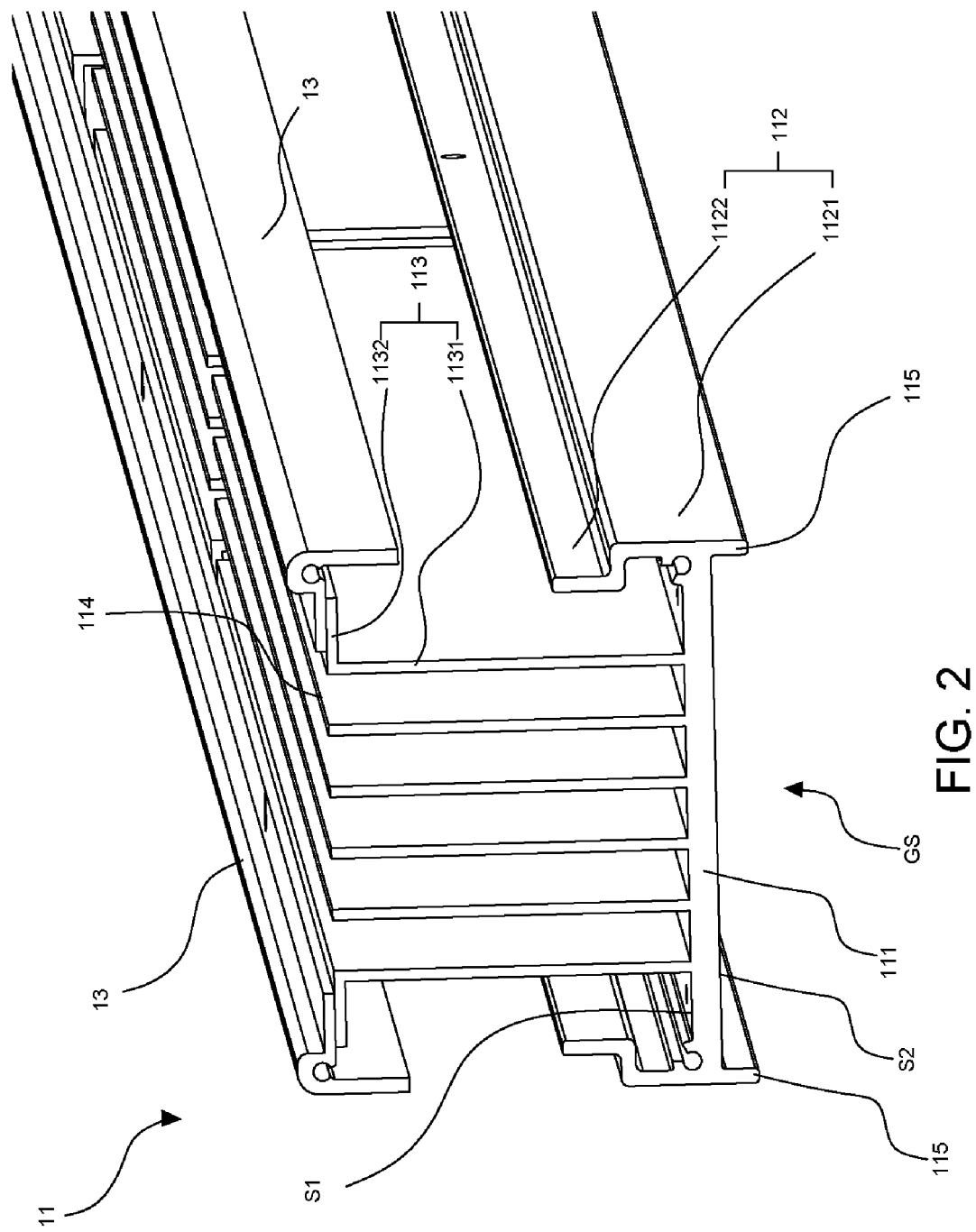
FIG. 2 is a second schematic view for illustrating the structure of the heat dissipation base of the plant growth lighting device having multi-function heat dissipation structure in accordance with one embodiment of the present invention.
Figure 3:
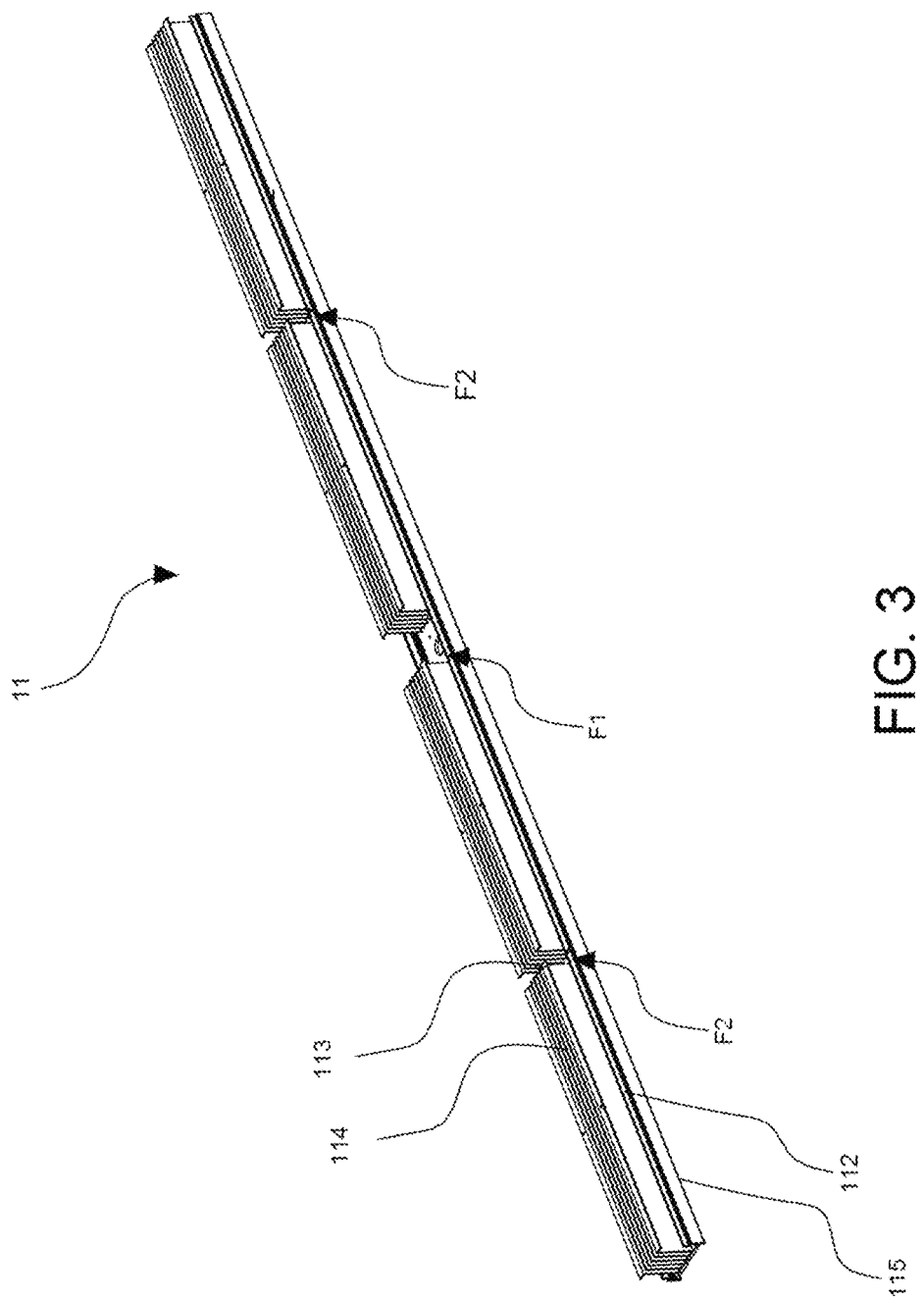
FIG. 3 is a third schematic view for illustrating the structure of the heat dissipation base of the plant growth lighting device having multi-function heat dissipation structure in accordance with one embodiment of the present invention.

Please refer to FIG. 1, FIG. 2 and FIG. 3, which are a first schematic view, a second schematic view and a third schematic view for illustrating a structure of a heat dissipation base of a plant growth lighting device having multi-function heat dissipation structure in accordance with one embodiment of the present invention. Please also refer to FIG. 4 and FIG. 5, which are a first schematic view and a second schematic view for illustrating a structure of the plant growth lighting device having multi-function heat dissipation structure in accordance with one embodiment of the present invention. As shown in FIG. 1-FIG. 5, the plant growth lighting device 1 includes a heat dissipation base 11, a light source board 12, two L-shaped decoration plates 13, two end caps 14, at least one water-proof cover 15 and at least one wire 16.

The heat dissipation base 11 includes a substrate 111, two structure supporting fins 112, two assistant fins 113, a plurality of heat dissipation fins 114 and two fixation portions 115. The two structure supporting fins 112, two assistant fins 113 and heat dissipation fins 114 are disposed on the first surface S1 of the substrate 111. The two fixation portions 115 are disposed on the second surface S2. An installation space GS is formed between the two fixation portions 115 and substrate 111. The two assistant fins 113 are disposed between the two structure supporting fins 112 and the heat dissipation fins 114 are disposed between the two assistant fins 113. The two structure supporting fins 112, two assistant fins 113 and heat dissipation fins 114 extend from one end of the substrate 111 to the other end of the substrate 111. Thus, the extending directions of the two structure supporting fins 112, two assistant fins 113 and heat dissipation fins 114 are the same with the length direction of the substrate 111. The heat dissipation base 11 further has a ventilation channel F1 and two ventilation channels F2. The ventilation channels F1, F2 penetrate through the two assistant fins 113 and heat dissipation fins 114. The diameter of the ventilation channel F1 is greater than that of the ventilation channels F2. The ventilation channel F1 is disposed between the ventilation channels F2 in order to form a symmetric structure. The structural design of the ventilation channels F1, F2 can effectively enhance ventilation effect so as to improve the heat dissipation performance of the heat dissipation structure. In one embodiment, the heat dissipation base 111 may be made of a metal material, such as aluminum, copper, iron, stainless steel, etc.

Besides, each of the assistant fins 113 includes a vertical portion 1131 and a horizontal portion 1132. The vertical portion 1131 is disposed on the substrate 111. The horizontal portion 1132 is disposed on the vertical portion 1131 and extends toward the structure supporting fin 112 adjacent thereto. Accordingly, the assistant fin 113 is L-shaped.

In addition, each of the structure supporting fins 112 includes a base portion 1121 and an L-shaped extending portion 1122. The base portion 1121 is disposed on the substrate 111. The L-shaped extending portion 1122 is disposed on the base portion 1121 and extends toward the assistant fin 113 adjacent thereto.

The two L-shaped decoration plates 13 are disposed on the horizontal portions 1132 of the two assistant fins 113. The two L-shaped decoration plates 13 can provide proper decoration effect, such that the appearance of the plant growth lighting device 1 can be more aesthetically acceptable. In one embodiment, the two L-shaped decoration plates 13 may be made of plastics. In another embodiment, the two L-shaped decoration plates 13 may be made of a metal material, such as aluminum, copper, iron, stainless steel, etc.

The two end caps 14 are disposed at the two ends of the heat dissipation base 11 in order to cover the two ends of the heat dissipation base 11. Similarly, the two end caps 14 can also provide proper decoration effect, such that the appearance of the plant growth lighting device 1 can be more aesthetically acceptable. In one embodiment, the two end caps 14 may be made of plastics. In another embodiment, the two end caps 14 may be made of a metal material, such as aluminum, copper, iron, stainless steel, etc.

The light source board 12 is disposed in the installation space GS. The light source board 12 includes a circuit board 121 and a plurality of light-emitting elements 122. In one embodiment, the light-emitting elements 122 may be LEDs. In another embodiment, the light-emitting elements 122 may be other currently available light sources.

As set forth above, the heat dissipation base 11 of the plant growth lighting device 1 has two structure supporting fins 112, two assistant fins 113 and a plurality of heat dissipation fins 114. The two structure supporting fins 112 can connect to a hook and provide the supporting function. The two assistant fins 113 can mount the two L-shaped decoration plates 13. In addition, the heat generated by the plant growth lighting device 1 can be dissipated via all of the above fins, such that the plant growth lighting device 1 can have a multi-function heat dissipation structure. This structure can greatly increase the heat dissipation area of the plant growth lighting device 1. Accordingly, the plant growth lighting device 1 can achieve excellent heat dissipation performance without increasing the number of the fins, which can significantly reduce the manufacturing cost of the plant growth lighting device 1. The aforementioned multi-function heat dissipation structure not only can achieve great heat dissipation performance, but also can increase the structural strength of the heat dissipation base 11. Accordingly, the plant growth lighting device 1 can always have sufficient structural strength even if the length of the plant growth lighting device 1 is greater than 1.5 m.

Further, the heat dissipation base 11 of the plant growth lighting device 1 has three ventilation channels F1, F2. These ventilation channels F1, F2 penetrate through the two assistant fins 113 and heat dissipation fins 114 to form a symmetric structure. The above structure can effectively improve ventilation effect, so the heat dissipation performance of the plant growth lighting device 1 can be further enhanced. The integration of the ventilation channels F1, F2 and the multi-function heat dissipation structure can dramatically enhance the heat dissipation performance of the plant growth lighting device 1.

The embodiment just exemplifies the present invention and is not intended to limit the scope of the present invention; any equivalent modification and variation according to the spirit of the present invention is to be also included within the scope of the following claims and their equivalents.

The embodiment just exemplifies the present invention and is not intended to limit the scope of the present invention; any equivalent modification and variation according to the spirit of the present invention is to be also included within the scope of the following claims and their equivalents.

Figure 6B:
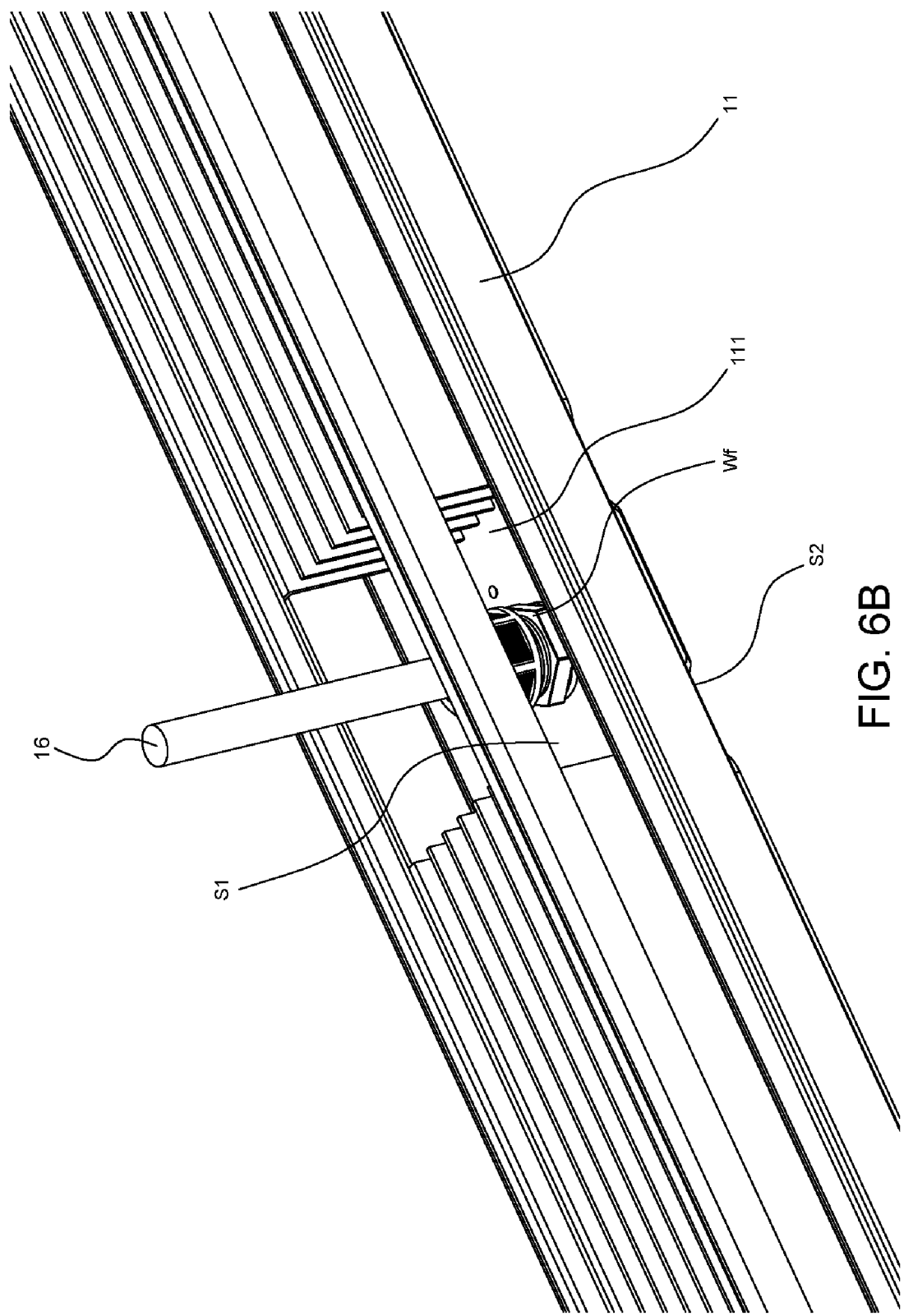
FIG. 6B is a second partial enlarged view for illustrating the structure of the plant growth lighting device having multi-function heat dissipation structure in accordance with one embodiment of the present invention.

Please refer to FIG. 6A and FIG. 6B, which are a first partial enlarged view and a second partial enlarged view for illustrating the structure of the plant growth lighting device having multi-function heat dissipation structure in accordance with one embodiment of the present invention respectively. As shown in FIG. 6A and FIG. 6B, the substrate 111 of the heat dissipation base 11 includes at least one wire hole LS. The wire 16 provided with a water-proof connector Wf passes through the wire hole LS via the first surface S1 of the substrate 111 in order to connect to the light source board 12 disposed on the second surface S2 of the substrate 111.

The embodiment just exemplifies the present invention and is not intended to limit the scope of the present invention; any equivalent modification and variation according to the spirit of the present invention is to be also included within the scope of the following claims and their equivalents.

Please refer to FIG. 7A and FIG. 7B, which are a first schematic view and a second schematic view for illustrating a structure of a water-proof cover of the plant growth lighting device having multi-function heat dissipation structure in accordance with one embodiment of the present invention. As shown in FIG. 7A and FIG. 7B, one side of the water-proof cover 15 has a water-proof rubber ring installation groove WP1 and a plurality of accommodating spaces AS. A water-proof rubber ring can be disposed in the water-proof rubber ring installation groove WP1 in order to prevent water from entering these accommodating spaces AS.

In this embodiment, the water-proof cover 15 has three accommodating spaces AS, so wires and other components can be disposed in these accommodating spaces AS. The other side of the water-proof cover 15 is provided with two inclined planes US symmetric to each other. If the light source board 12 disposed on the second surface S2 of the substrate 11 is provided with a lens 19, the inclined planes US can reduce the visual height difference between the water-proof cover 15 and lens 19, which can further improve the appearance of the plant growth lighting device 1.

The water-proof cover 15 is disposed on the second surface S2 of the substrate 111 and fixed on the second surface S2 of the substrate 111 via one or more fixation elements Fx (e.g., screws, bolts, etc.). The water-proof cover 15 covers the wire hole LS so as to provide the water-proof function for the wire 16.

The embodiment just exemplifies the present invention and is not intended to limit the scope of the present invention; any equivalent modification and variation according to the spirit of the present invention is to be also included within the scope of the following claims and their equivalents.

It is worthy to point out that the power of the currently available plant growth lighting devices is limited due to poor heat dissipation performance thereof. In addition, the length of the currently available plant growth lighting devices cannot be further increased because of the structural designs thereof. Therefore, the length of most currently available plant growth lighting devices is less than 1.5 m. In order to improve the heat dissipation performance, the heat dissipation structures of the currently available plant growth lighting devices need a large number of heat dissipation fins, which greatly increases the manufacturing cost of these plant growth lighting devices. On the contrary, according to one embodiment of the present invention, the heat dissipation base of the plant growth lighting device has two structure supporting fins, two assistant fins and a plurality of heat dissipation fins. The two structure supporting fins can connect to a hook and provide the supporting function. The two assistant fins can mount two L-shaped decoration plates. All of the above fins can provide the heat dissipation function, such that the heat dissipation area of the plant growth lighting device can be greatly increased and the plant growth lighting device can achieve excellent heat dissipation performance without increasing the number of these fins. Therefore, the manufacturing cost of the plant growth lighting device can be reduced and the power thereof can be also effectively increased.

Besides, according to one embodiment of the present invention, the heat dissipation base of the plant growth lighting device has at least one ventilation channel, which can penetrate through the two assistant fins and heat dissipation fins. The above structure design can effectively enhance air convection, such that the heat dissipation performance of the plant growth lighting device can be further improved.

Further, according to one embodiment of the present invention, the heat dissipation base of the plant growth lighting device has a multi-function heat dissipation structure, which not only can achieve great heat dissipation performance, but also can enhance the structural strength of the heat dissipation base. Thus, the plant growth lighting device can always have enough structural strength even if the length thereof is greater than 1.5 m.

Moreover, according to one embodiment of the present invention, the plant growth lighting device further includes a water-proof cover. The wire passes through the wire hole via the first surface of the substrate so as to connect to the light source board. The water-proof cover is disposed on the second surface and covers the wire hole. Besides, the wire can be provided with a water-proof connector. The above structural design can greatly enhance the water-proof performance of the plant growth lighting device. As previously stated, the plant growth lighting device having multi-function heat dissipation structure can definitely achieve great technical effects.

Figure 4:
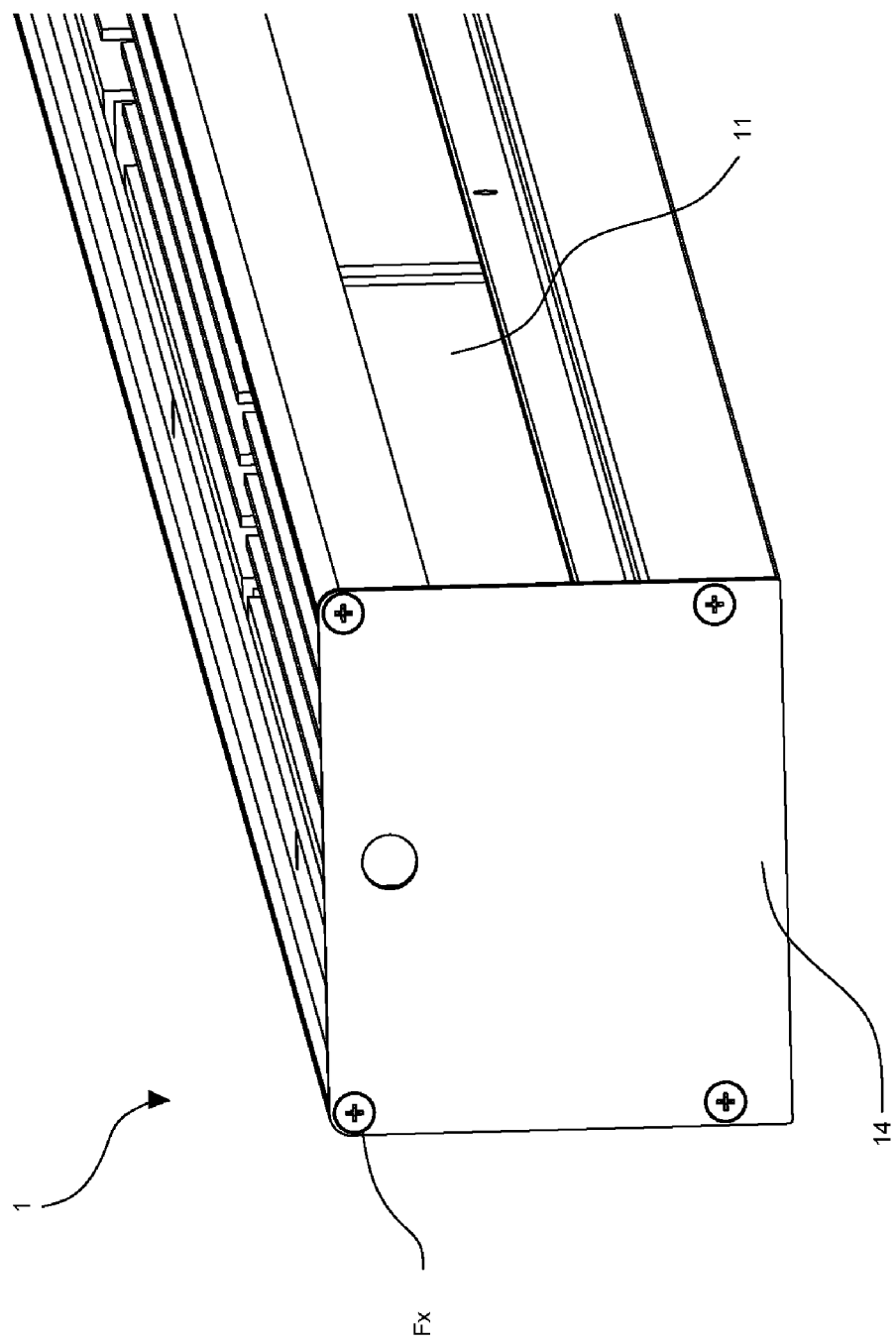
FIG. 4 is a first schematic view for illustrating a structure of the plant growth lighting device having multi-function heat dissipation structure in accordance with one embodiment of the present invention.
Figure 8:
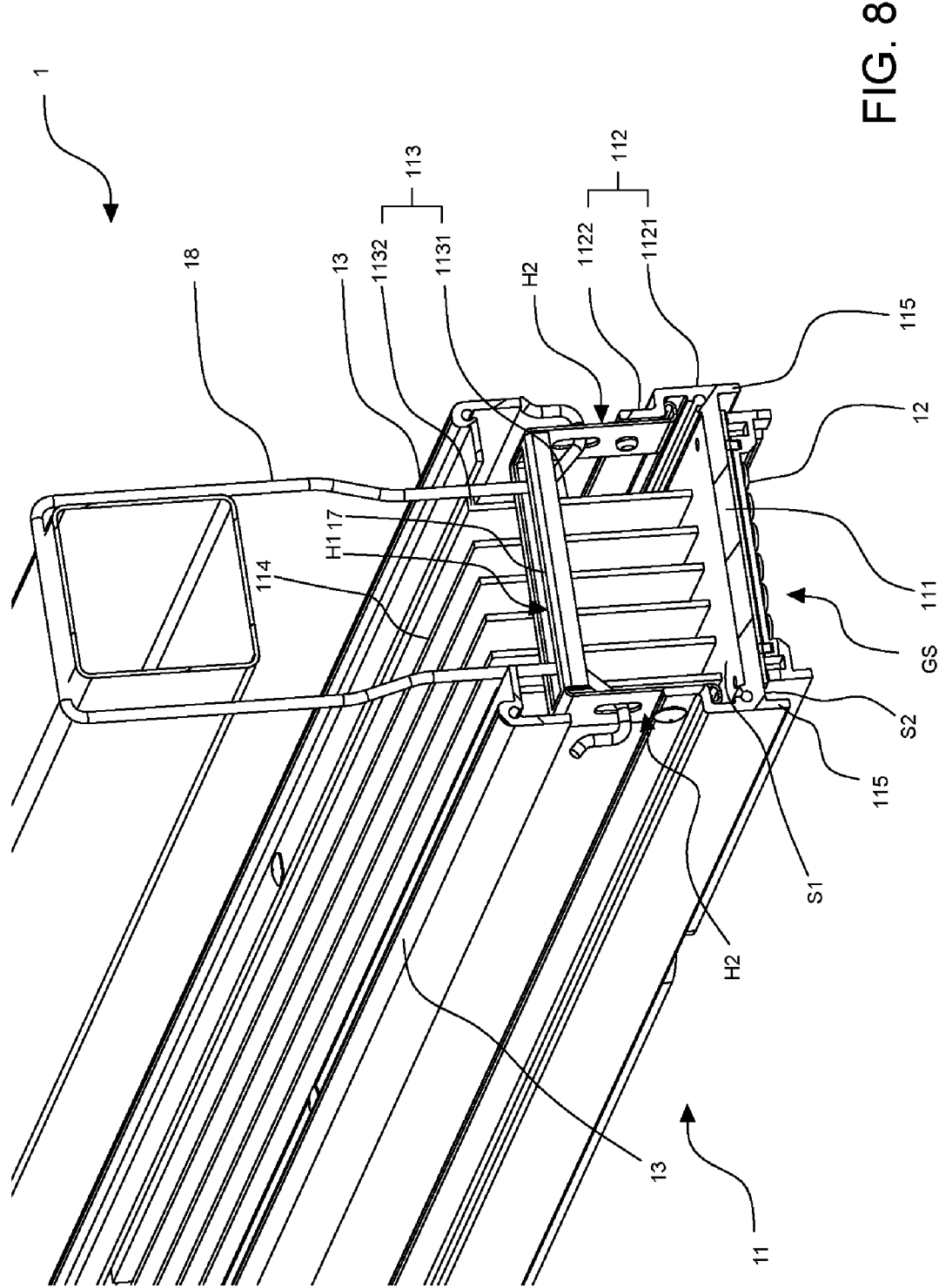
FIG. 8 is a first schematic view for illustrating a structure of a heat dissipation base of a plant growth lighting device having multi-function heat dissipation structure in accordance with another embodiment of the present invention.
Figure 9:
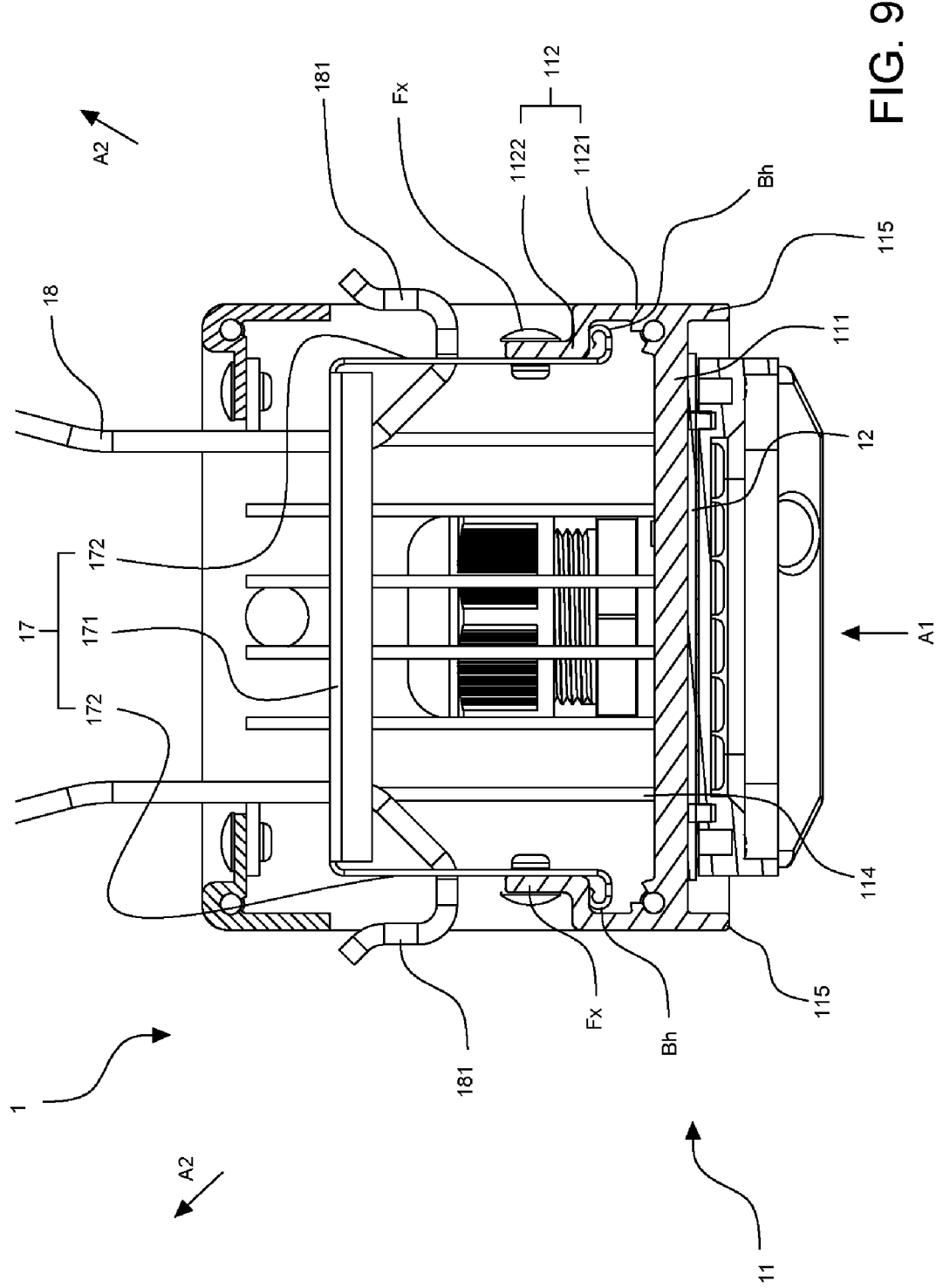
FIG. 9 is a second schematic view for illustrating the structure of the heat dissipation base of the plant growth lighting device having multi-function heat dissipation structure in accordance with another embodiment of the present invention.

Please refer to FIG. 8 and FIG. 9, which are a first schematic view and a second schematic view for illustrating a structure of a heat dissipation base of a plant growth lighting device having multi-function heat dissipation structure in accordance with another embodiment of the present invention respectively. Please also refer to FIG. 2, FIG. 4, FIG. 5, FIG. 6A, FIG. 7A and FIG. 7B. As shown in the above figures, the plant growth lighting device 1 includes a heat dissipation base 11, a light source board 12, two L-shaped decoration plates 13, two end caps 14 (as shown in FIG. 4), at least one water-proof cover 15 (as shown in FIG. 7A and FIG. 7B) and at least one wire 16 (as shown in FIG. 6B).

The heat dissipation substrate 11 includes a substrate 11, two structure supporting fins 112, two assistant fins 113, a plurality of heat dissipation fins 114 and two fixation portions 115. The two structure supporting fins 112, two assistant fins 113 and heat dissipation fins 114 are disposed on the first surface S1 of the substrate 111. The two fixation portions 115 are disposed on the second surface S2 of the substrate 111. There is an installation space GS formed between the two fixation portions 115 and substrate 111. The above two assistant fins 113 are disposed between the two structure supporting fins 112 and the heat dissipation fins 114 are disposed between the two assistant fins 113. The two structure supporting fins 112, two assistant fins 113 and heat dissipation fins 114 extend from one end of the substrate 111 to the other end of the substrate 111. Therefore, the extending directions of the two structure supporting fins 112, two assistant fins 113 and heat dissipation fins 114 are the same with the length direction of the substrate 111. The heat dissipation base 11 further has a ventilation channel F1 and two ventilation channels F2 (as shown in FIG. 2). The ventilation channels F1, F2 penetrate through the two assistant fins 113 and heat dissipation fins 114. The diameter of the ventilation channel F1 is greater than that of the ventilation channels F2. The ventilation channel F1 is disposed between the ventilation channels F2 in order to form a symmetric structure.

Moreover, each of the assistant fins 113 includes a vertical portion 1131 and a horizontal portion 1132. The vertical portion 1131 is disposed on the substrate 111. The horizontal portion 1132 is disposed on the vertical portion 1131 and extends toward the structure supporting fin 112 adjacent thereto. Thus, the assistant fin 113 is L-shaped.

Further, each of the structure supporting fins 112 includes a base portion 1121 and an L-shaped extending portion 1122. The base portion 1121 is disposed on the substrate 111. The L-shaped extending portion 1122 is disposed on the base portion 1121 and extends toward the assistant fin 113 adjacent thereto.

The two L-shaped decoration plates 13 are disposed on the horizontal portions 1132 of the two assistant fins 113.

The two end caps 14 (as shown in FIG. 4) are disposed at the two ends of the heat dissipation base 11 in order to cover the two ends of the heat dissipation base 11.

Figure 5:
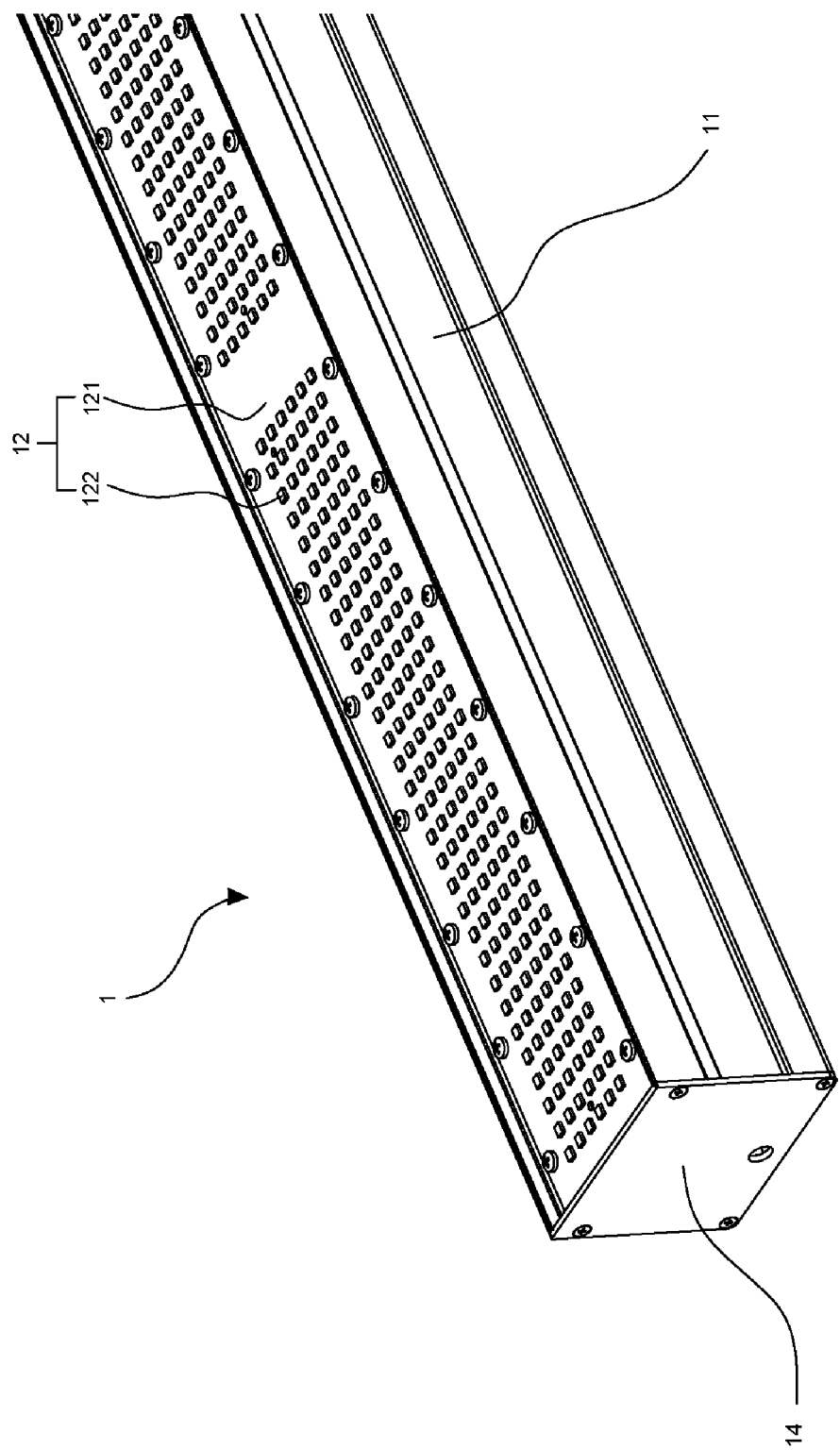
FIG. 5 is a second schematic view for illustrating the structure of the plant growth lighting device having multi-function heat dissipation structure in accordance with one embodiment of the present invention.

The light source board 12 is disposed in the installation space GS. The light source board 12 includes a circuit board 121 and a plurality of light-emitting elements 122 (as shown in FIG. 5).

The above elements are similar to those of the previous embodiment, so will not be described herein again. The difference between this embodiment and the previous embodiment is that the plant growth lighting device 1 further includes a hook holder 17 and a hook 18.

The hook holder 17 includes a central frame body 171 and two L-shaped fixation portions 172. The two L-shaped fixation portions 172 are disposed at the two ends of the central frame body 171 respectively. Each of the L-shaped fixation portions 172 is engaged with the L-shaped extending portion 1122 of the structure supporting fin 112 corresponding thereto. In this embodiment, each of the L-shaped fixation portions 172 is fixed on the L-shaped extending portion 1122 of the structure supporting fin 112 corresponding thereto via a fixation element Fx (e.g., a screw, a bolt, etc.). The bottom of each L-shaped fixation portion 172 is further provided with a barb Bh, which can effectively be engaged with the L-shaped extending portion 1122 of the structure supporting fin 112 corresponding thereto. In addition, the central frame body 171 has a central hole H1 and each L-shaped fixation portion 172 has a lateral hole H2.

The hook 18 has two hook portions 181. Each of the hook portions 181 penetrates through the central hole H1 and the lateral hole H2 of the L-shaped fixation portion 172 corresponding thereto.

When the plant growth lighting device 1 is impacted by an external force (the direction of the external force are the arrow A1 shown in FIG. 9), each hook portion 181 is deformed toward the direction away from the substrate 111 (the deformation directions are the arrows A2 shown in FIG. 9). The above structure can effectively prevent the plant growth lighting device 1 from falling off hook 18 due to the impact caused by the external force. As a result, the safety of the plant growth lighting device 1 can be effectively enhanced.

The embodiment just exemplifies the present invention and is not intended to limit the scope of the present invention; any equivalent modification and variation according to the spirit of the present invention is to be also included within the scope of the following claims and their equivalents.

Figure 10:
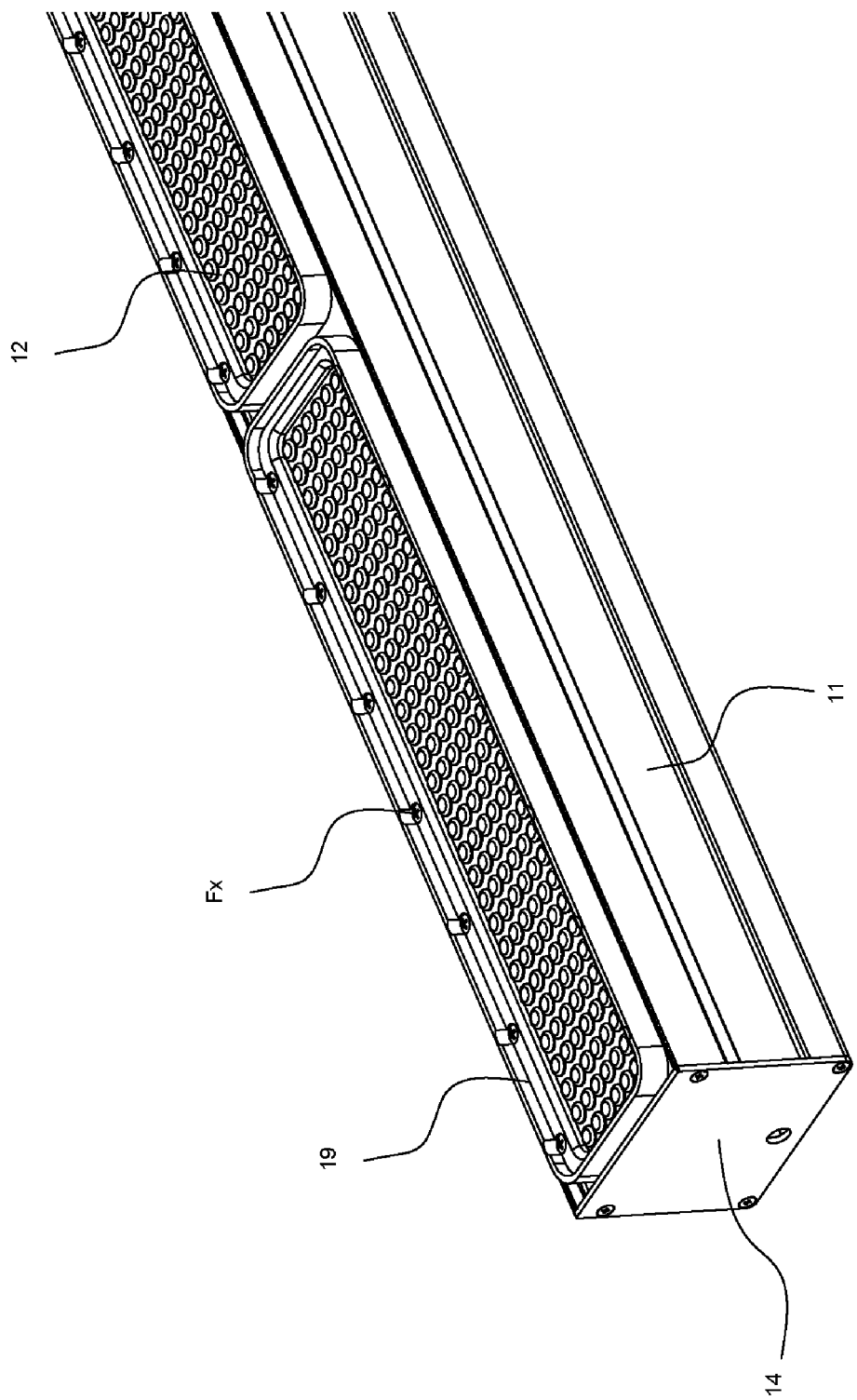
FIG. 10 is a third schematic view for illustrating the structure of the heat dissipation base of the plant growth lighting device having multi-function heat dissipation structure in accordance with another embodiment of the present invention.
Figure 11A:
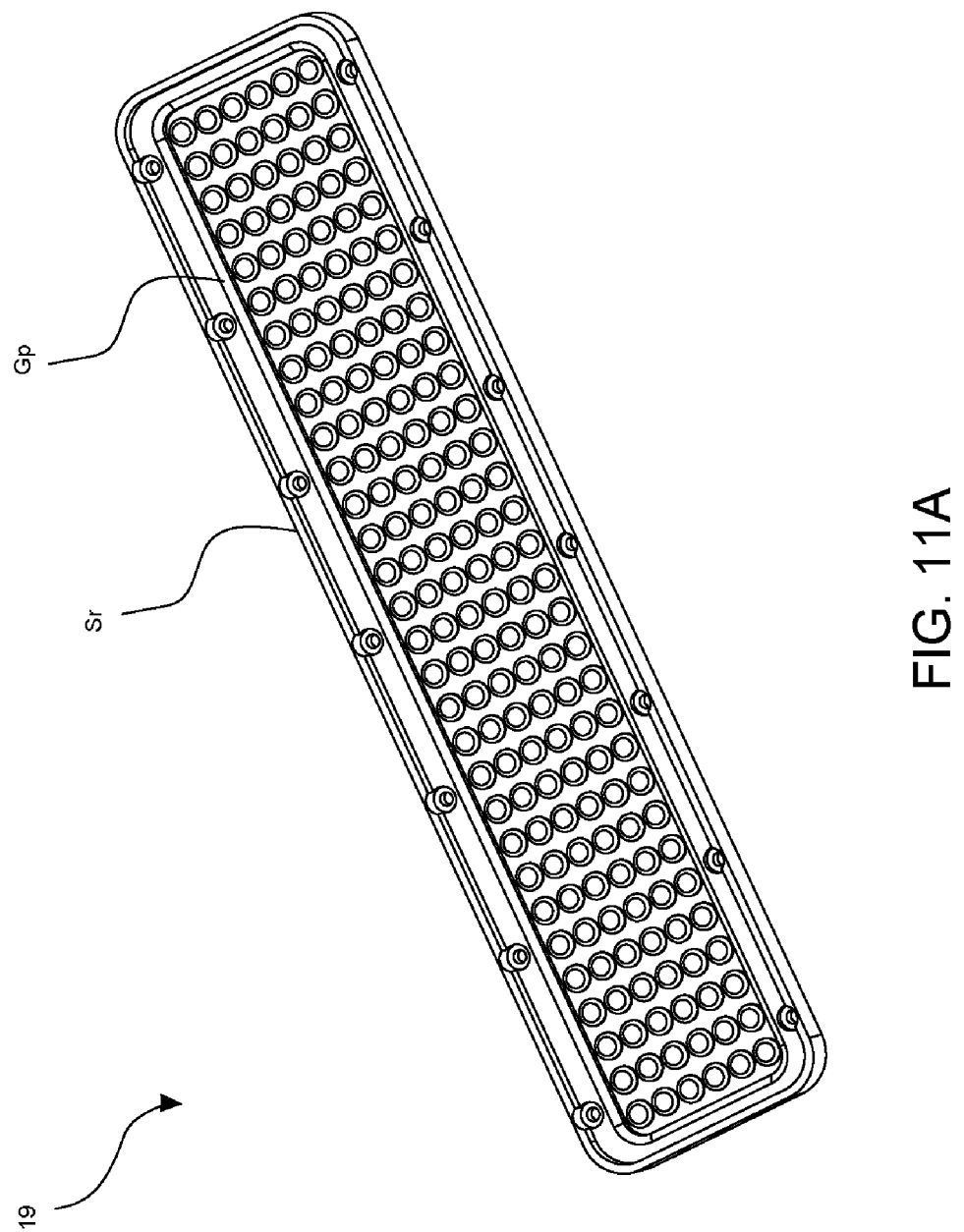
FIG. 11A is a top view for illustrating a lens of the plant growth lighting device having multi-function heat dissipation structure in accordance with another embodiment of the present invention.
Figure 11B:
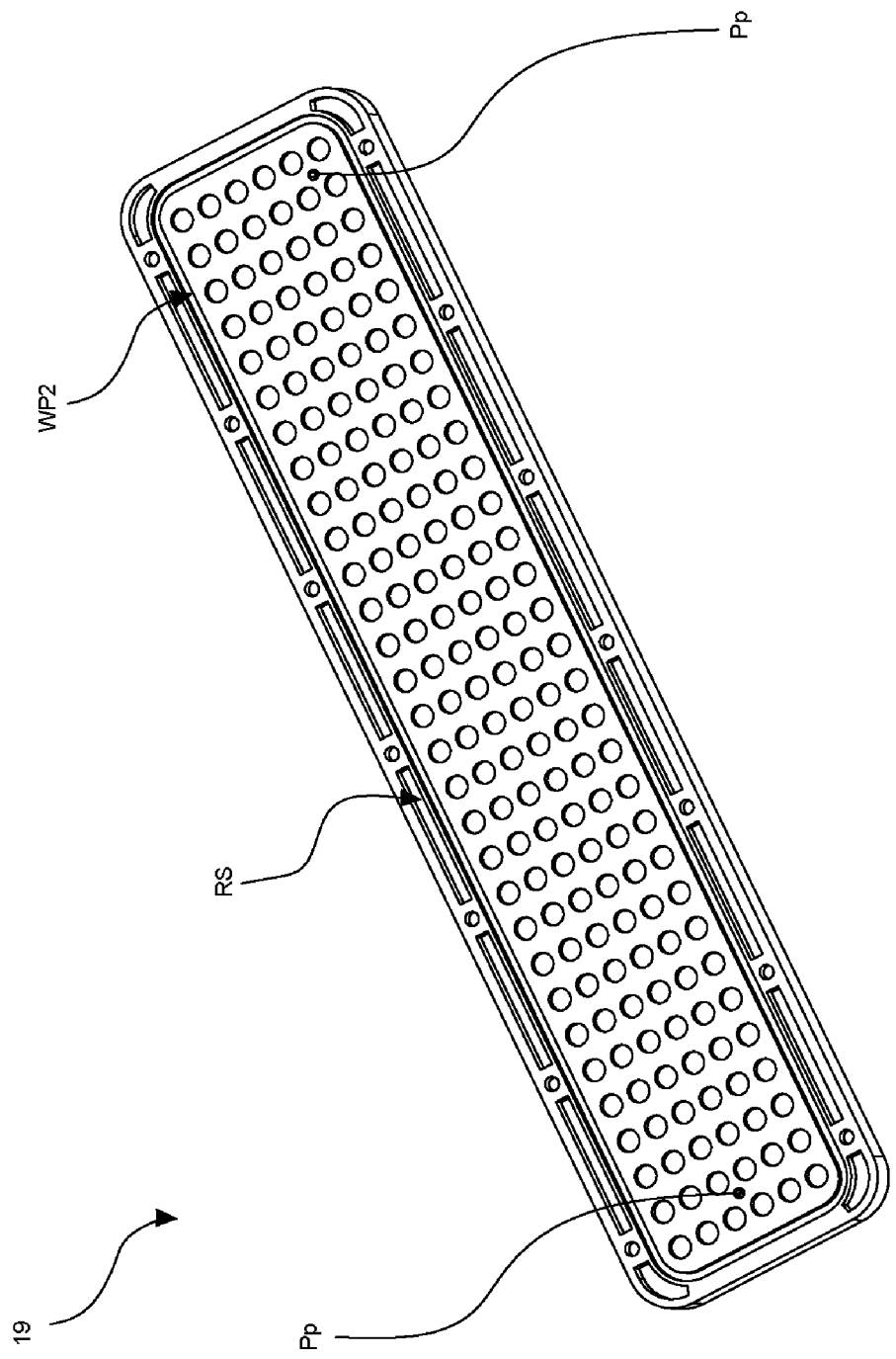
FIG. 11B is a bottom view for illustrating the lens of the plant growth lighting device having multi-function heat dissipation structure in accordance with another embodiment of the present invention.

Please refer to FIG. 10, which is a third schematic view for illustrating the structure of the heat dissipation base of the plant growth lighting device having multi-function heat dissipation structure in accordance with another embodiment of the present invention. Please also refer to FIG. 11A and FIG. 11B, which are a top view and a bottom view for illustrating a lens of the plant growth lighting device having multi-function heat dissipation structure in accordance with another embodiment of the present invention. As shown in FIG. 10, FIG. 11A and FIG. 11B, the plant growth lighting device 1 further includes a lens 19. In one embodiment, the lens 19 may be manufactured by plastic injection molding and the lens 19 may be made of a transparent or semi-transparent material, such as plastics. The lens 19 can cover the light source board 12 and be fixed on the heat dissipation base 11 via one or more fixation elements Fx (screws, bolts, etc.).

As shown in FIG. 11B, the surface, adjacent to the light source board 12, of the lens 19 may include a plurality of weight-reducing grooves RS, a water-proof rubber ring installation groove WP2 and two positioning posts Pp. The weight-reducing grooves RS can decrease the weight of the lens 19, such that the overall weight of the plant growth lighting device 1 can be further reduced without influencing the structural strength of the lens 19. Via the above two positioning posts Pp, the lens can be accurately installed on the heat dissipation base 11. The water-proof rubber ring can be installed in the water-proof rubber ring installation groove WP2 in order to prevent water from entering the inner space of the lens 19. Accordingly, the water-proof performance of the plant growth lighting device 1 can be further enhanced.

As shown in FIG. 11A, the other surface of the lens 19 may include a reinforcement rib Sr and a light guide portion Gp. The reinforcement rib Sr can be disposed on the edge of the lens 19 so as to prevent the lens from being deformed because of an external force. The light guide portion Gp has a slope, so the light source board 12 can emit light by a proper angle.

As described above, the lens 19 of the plant growth lighting device 1 has the reinforcement rib Sr, water-proof rubber ring installation groove WP2 and weight-reducing grooves RS. The above structural design not only can enhance the water-proof performance of the plant growth lighting device 1, but also can decrease the overall weight of the plant growth lighting device 1 without influencing the structural strength thereof. Accordingly, the manufacturing cost of the plant growth lighting device 1 can be effectively reduced.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the heat dissipation base of the plant growth lighting device has two structure supporting fins, two assistant fins and a plurality of heat dissipation fins. The two structure supporting fins can connect to a hook and provide the supporting function. The two assistant fins can mount two L-shaped decoration plates. All of the above fins can provide the heat dissipation function, such that the heat dissipation area of the plant growth lighting device can be greatly increased and the plant growth lighting device can achieve excellent heat dissipation performance without increasing the number of these fins. Therefore, the manufacturing cost of the plant growth lighting device can be reduced and the power thereof can be also effectively increased.

Also, according to one embodiment of the present invention, the heat dissipation base of the plant growth lighting device has at least one ventilation channel, which can penetrate through the two assistant fins and heat dissipation fins. The above structure design can effectively enhance air convection, such that the heat dissipation performance of the plant growth lighting device can be further improved.

Besides, according to one embodiment of the present invention, the heat dissipation base of the plant growth lighting device has a multi-function heat dissipation structure, which not only can achieve great heat dissipation performance, but also can enhance the structural strength of the heat dissipation base. Thus, the plant growth lighting device can always have enough structural strength even if the length thereof is greater than 1.5 m.

Further, according to one embodiment of the present invention, the hook of the plant growth lighting device is disposed on a hook holder having the safety structure, which can effectively prevent the plant growth lighting device from falling off the hook because of the impact caused by an external force. Therefore, the safety of the plant growth lighting device can be effectively enhanced.

Moreover, according to one embodiment of the present invention, the plant growth lighting device further includes a water-proof cover. The wire passes through the wire hole via the first surface of the substrate so as to connect to the light source board. The water-proof cover is disposed on the second surface and covers the wire hole. Besides, the wire can be provided with a water-proof connector. The above structure design can greatly enhance the water-proof performance of the plant growth lighting device.

Furthermore, according to one embodiment of the present invention, the plant growth lighting device further includes a lens and the lens has a reinforcement rib, a water-proof rubber ring installation groove and weight-reducing grooves. The above structural design not only can enhance the water-proof performance of the plant growth lighting device, but also can decrease the weight of the plant growth lighting device without influencing the structural strength thereof.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A plant growth lighting device having multi-function heat dissipation structure, comprising:
    a heat dissipation base comprising a substrate, two structure supporting fins, two assistant fins, a plurality of heat dissipation fins and two fixation portions, wherein the structure supporting fins, the assistant fins, and the heat dissipation fins are disposed on a first surface of the substrate, and the fixation portions are disposed on a second surface of the substrate, and an installation space is formed between the two fixation portions and the substrate, wherein each of the structure supporting fins includes a base portion disposed on the substrate and an L-shaped extending portion disposed on the base portion, wherein the L-shaped extending portion extends toward the assistant fin adjacent thereto;
    a light source board disposed in the installation space; and
    a hook holder comprising a central frame body and two L-shaped fixation portions disposed at two ends of the central frame body respectively, wherein the central frame body has a central hole and each of the L-shaped fixation portions has a lateral hole;
    wherein the two assistant fins are disposed between the two structure supporting fins and the heat dissipation fins are disposed between the two assistant fins, wherein the two structure supporting fins, the two assistant fins and the heat dissipation fins extend from one end of the substrate to another end of the substrate.

2. The plant growth lighting device having multi-function heat dissipation structure as claimed in claim 1, wherein each of the assistant fins includes a vertical portion disposed on the substrate and a horizontal portion disposed on the vertical portion, wherein the horizontal portion extends toward the structure supporting fin adjacent thereto, whereby the assistant fin is L-shaped.

3. The plant growth lighting device having multi-function heat dissipation structure as claimed in claim 1, comprising a hook having two hook portions, wherein each of the hook portions penetrates through the central hole and the lateral hole of the L-shaped fixation portion corresponding thereto.

4. The plant growth lighting device having multi-function heat dissipation structure as claimed in claim 1, further comprising two L-shaped decoration plates disposed on the two assistant fins respectively.

5. The plant growth lighting device having multi-function heat dissipation structure as claimed in claim 1, further comprising two end caps disposed at two ends of the heat dissipation base.

6. The plant growth lighting device having multi-function heat dissipation structure as claimed in claim 1, further comprising a water-proof cover, wherein the substrate has a wire hole and a wire passes through the wire hole via the first surface in order to connect to the light source board, wherein the water-proof cover is disposed on the second surface and cover the wire hole.

7. The plant growth lighting device having multi-function heat dissipation structure as claimed in claim 1, wherein the heat dissipation base has a ventilation channel passing through the two assistant fins and the heat dissipation fins.

* * * * *